United States Patent [19]

Suzuki et al.

[11] Patent Number: 5,217,152
[45] Date of Patent: Jun. 8, 1993

[54] GEAR MECHANISM AND RECORD MEDIUM FEEDING APPARATUS EMPLOYING THE SAME

[75] Inventors: Katsumi Suzuki; Shin Takeuchi, both of Suwa, Japan

[73] Assignee: Seiko Epson Corporation, Tokyo, Japan

[21] Appl. No.: 849,797

[22] Filed: Mar. 11, 1992

Related U.S. Application Data

[63] Continuation of Ser. No. 478,138, Feb. 9, 1990, abandoned.

[30] Foreign Application Priority Data

Feb. 10, 1989 [JP]  Japan .................................. 1-31603
Dec. 1, 1989 [JP]  Japan .................................. 1-313191

[51] Int. Cl.⁵ ..................... B65H 43/04; B65H 26/02; B65H 20/08
[52] U.S. Cl. ...................................... 226/25; 226/120; 226/155; 226/156; 226/187; 74/435
[58] Field of Search ............... 226/24, 25, 10, 120, 226/152, 154, 155, 156, 187; 74/435, 421 A

[56] References Cited

U.S. PATENT DOCUMENTS

| | | | |
|---|---|---|---|
| 3,058,366 | 10/1962 | Matthews | 74/435 |
| 3,229,878 | 1/1966 | Hurlbut et al. | 226/25 |
| 3,246,822 | 4/1966 | Skeen | 226/155 |
| 3,696,982 | 10/1972 | Gottschall | 226/25 |
| 4,049,340 | 9/1977 | Krumbein | 226/25 X |
| 4,173,420 | 11/1979 | Otabe | 226/155 X |
| 4,351,460 | 9/1982 | Ouellette | 221/25 |
| 4,785,362 | 11/1988 | Nozawa et al. | 74/435 X |

Primary Examiner—Daniel P. Stodola
Assistant Examiner—Paul T. Bowen
Attorney, Agent, or Firm—W. Douglas Carothers, Jr.

[57] ABSTRACT

A gear mechanism provides for intermittent drive operation with precision stop location of angular position of one (driven) gear driven by another (drive) gear which is accomplished by increasing the precision of the distance maintained between the rotational centers of the gears so that a stabilized and precision amount of gear engagement is provided between both gears resulting in a precise amount of rotation imparted to the driven gear per revolution of the drive gear. The precisions of the distant between the gear rotational centers is accomplished by engagement of circumferential surfaces of corresponding cylindrical portions on each gear or provided on associated gears in the gear train of the gear mechanism.

25 Claims, 4 Drawing Sheets

GEAR MECHANISM AND RECORD MEDIUM FEEDING APPARATUS EMPLOYING THE SAME

This is a continuation of copending application Ser. No. 07/478,138 filed Feb. 9, 1990, now abandoned.

BACKGROUND OF THE INVENTION

This invention relates generally to a gear mechanism and more particularly to a gear mechanism having means for precise predetermined movement of a driven member and, further, having means capable of disengagement of gears to prevent damage to the gears during an occurrence of an abnormal load applied to the gear mechanism. The gear mechanism of this invention has application to a record medium feeding apparatus for feeding a record medium, such as paper, transparent film or thermal sensitive material in conjunction with a printer or the like.

Japanese Publication No. 50876/83 discloses the typical type of gear mechanism used in conjunction with a record medium feeding apparatus, such as employed in conjunction with a printer or the like. The gear mechanism is designed so that drive gear 9 intermittently drives the driven gear 8 for intermittent feeding of the medium to the printer. In the apparatus shown in this publication, the angular position of the shaft of driven gear 8 is determined by the position where roller shaft 4 comes into engagement with oval shaped hole 6-1 of bearing 6. However, the distance between the centers of drive gear 9 and driven gear 8 is determined by supporting member 1, bearing 6, roller shaft 4, and drive gear shaft 10. Since there are many interrelated components involved, there is the frequent occurrence of an aberration in and stability of gear engagement between driving gear 9 and driven gear 8 resulting in the frequent occurrence of skipped gear engagement. Also, when this type of gear mechanism is employed in such a medium feeding apparatus, it frequently operates in an intermittent, nonuniform fashion. Unless the distance between the centers of drive gear 9 and driven gear 8 is continuously maintained, the angular position wherein driven gear 8 is locked for driving engagement by drive gear 9 will vary from cycle to cycle. As a result, the incremental amount of fed medium from cycle to cycle is not the same and the time period of incrementally fed medium from cycle to cycle is not uniform. These problems become more exaggerated when hole 6-1 of bearing 6 becomes worn. As a result, adjacently printed characters on the medium will not be printed evenly and the desired standard of print quality is substantially reduced.

It is an object of the present invention to provide a gear mechanism wherein precise intermittent movement may be provided to a driven gear by a drive gear without the occurrence of skipped gear engagement.

Another object of this invention is a gear mechanism for a medium feeding apparatus providing for precision in the metered amount of intermittently fed medium in a printer as well as providing uniformity in the time period or cycle of intermittent feeding of precise amounts of medium.

It is another object of this invention to prevent damage to gears of a gear mechanism transferring power to a load during the occurrence of an abnormal load applied to the gear mechanism.

SUMMARY OF THE INVENTION

According to this invention, a gear mechanism provides for intermittent drive operation with precision stop location of angular position of one (driven) gear driven by another (drive) gear which is accomplished by increasing the precision of the distance maintained between the rotational centers of the gears so that a stabilized and precision amount of gear engagement is provided between both gears resulting in a precise amount of rotation imparted to the driven gear per revolution of the drive gear. The preciseness of the distant between the gear rotational centers is accomplished by engagement of circumferential surfaces of corresponding cylindrical portions on each gear or provided on associated gears in the gear train of the gear mechanism. Further, if the diameter of the cylindrical portion associated with each gear is made equal to the pitch diameter of each gear, wearing of the cylindrical portions of the gears can be prevented thereby improving the durability of the gear mechanism as well as precision maintenance of the distance between the centers of the gears as well as a reduction in the rotational load on the gears.

The gear mechanism of this invention comprises a drive gear and a driven gear which have engaging circumferential surfaces of corresponding gear cylindrical portions with the driven gear continuously biased toward the drive gear by biasing means. As a result, the center of rotation of the driven gear is continuously determined by the position where the surfaces of these cylindrical portions of these gears are brought into contact with each other. In other words, the distance between the centers of drive gear and driven gear is determined exclusively by the size of cylindrical portion of each gear without being affected by the size or engagement of any other components comprising the gear mechanism.

The gear mechanism of this invention also includes means capable of disengaging gears during the occurrence of an abnormal load applied against the gear mechanism and its associated power train. Since the preciseness of the distance between the centers of drive gear and driven gear of the gear mechanism is determined only by the preciseness of the dimensions of these two components, high precision can be obtained in disengagement of the gears in the gear system during such an occurrence without resulting damage to the gears thereby preventing skipped gear engagement, which is a common occurrence in the past in gear mechanisms of this type.

The gear mechanism of this invention may be employed in a medium feeding apparatus, such as employed in conjunction with a printer or the like, and provide for improvement in the precision of periodic incremental amounts of medium fed to the printer thereby improving the quality of printing due to the continuous reliability of the medium feed operation brought about by the gear mechanism of this invention.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
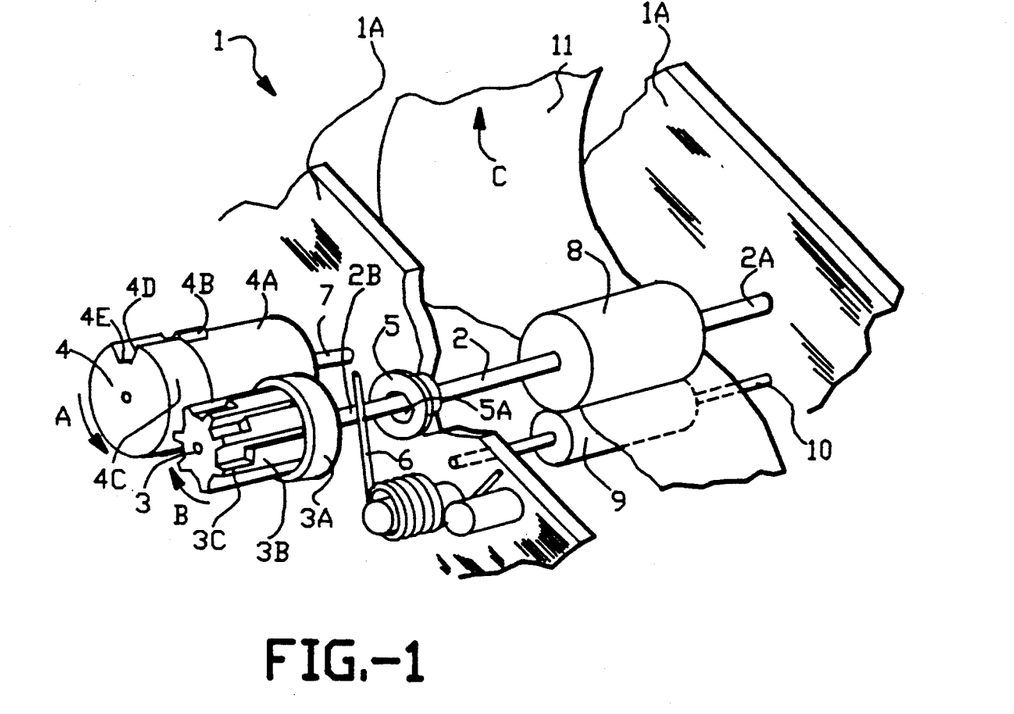
FIG. 1 is a perspective view of a medium feeding apparatus illustrating one embodiment of this invention.
Figure 2:
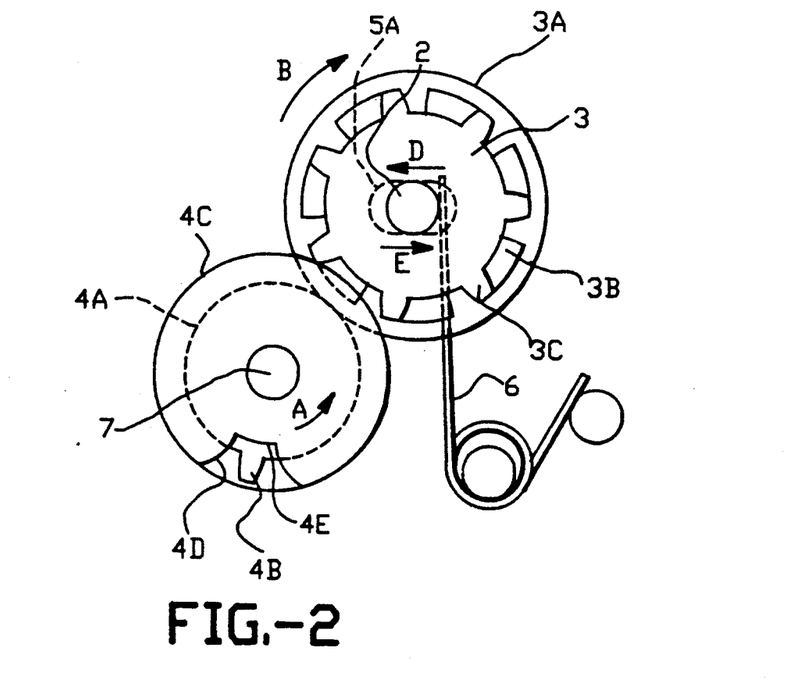
FIG. 2 is a detailed view of a side elevation of the gear mechanism shown in FIG. 1.

Reference is now made to FIGS. 1 and 2 wherein there is shown the first embodiment of a record medium feeding apparatus 1 comprising of this invention. Apparatus 1 comprises a support frame 1A upon one portion of which is secured a support shaft 7. Shaft 7 supports drive gear 4 which is rotated on shaft 7 with uniform rotational velocity by means of a motor via a coupled gear train (not shown). medium feed shaft 2 has one end 2A rotatably supported on another portion of frame 1A. The other end 2B of shaft 2 extends through elongated opening or aperture 5A of shaft support member 5 and supports driven gear 3 which is fixed to rotate with shaft 2. Medium feed roll 8 is positioned at a central portion of shaft 2 and is fixed to also rotate with shaft 2. Another shaft 10 is also supported on the same frame portion and roll 9 is rotatably supported on shaft 10 to rotatably support medium 11 as the same is fed between rolls 8 and 9 in the direction indicated by arrow C. Shaft 10 is biased (not shown) upwardly toward shaft 2 so that roll 9 securely engages medium 11 between rolls 8 and 9.

Drive gear 4 has a raised cylindrically shaped cam 4C that includes an arcuate engagement portion comprising a raised tooth portion 4B and a recessed portion 4E. Adjacent to and aligned with recessed portion 4E is a raised tooth portion 4B. Recessed portion 4E is formed in a circumferential cam 4C on the end of gear 4 and portion 4E has a tooth portion 4D. Adjacent to circumferential cam 4C is a cylindrical portion 4A, the function of which will be explained later. The surface of cam 4C, however, extends above the surface of cylindrical portion 4A, i.e., the circumferential surface of cam 4A has a larger diameter compared to the diameter of the circumferential surface of cylindrical portion 4A. Driven gear 3 has two adjacent teeth portions 3B and 3C for the full circumference of the gear wherein the pitch of teeth portions 3C is greater than that of teeth portions 3B. Upon rotation of gear 4, its tooth portion 4B interengages with teeth portion 3B of gear 3 and its tooth portion 4D engages with tooth portion 3C of gear 3, as explained later in further detail.

As best seen in FIG. 2, shaft 2 is also biased in the direction of arrow D by means of spring 6 supported from frame 1A in the manner illustrated in FIG. 1. The predetermined stop position for shaft 2 in biased direction D is the engagement of cylindrical portion 3A of driven gear 3 with cylindrical portion 4A of drive gear 4, which defines the distance relationship between the rotational centers of driven gear 3 and drive gear 4. Thus, surfaces 3A and 4A function as a gauge to maintain a predetermined distance relative to the center of gears 3 and 4. It should be noted that in spite of the engagement of surfaces 3A and 4A as a gauge, this engagement is not of sufficient frictional contact to transfer driving force to driven gear because of the greater load and resistance to such rotation on driven gear by medium 11 engagement with roll 8 and, more importantly, due to the locking of driven gear 3 from such movement due to the peripheral engagement of the surface of cylindrically shaped cam 4C between adjacent gear teeth portions 3C and engagement of the forward surface of one such tooth portion 3C against the surface of cam 4C. This condition is generally depicted in FIG. 2 as well as FIG. 7, which condition is explained later in further detail.

As can be seen in both FIGS. 1 and 2, drive gear 4 is continually rotated in the direction indicated by arrow A. When tooth portion 4B of drive gear 4 engages with tooth portion 3B of driven gear 3, driven gear 3 will be caused to rotate a predetermined amount in the direction indicated by arrow B. Further, when tooth portion 4D of drive gear 4 eventually engages with tooth portion 3C of driven gear 3 as rotation of gear 3 continues, driven gear 3 will stop rotating in a condition wherein tooth portion 3C of gear 3 is in engagement with cam 4C of drive gear 4. In other words, drive gear 4 rotates driven gear 3 a predetermined amount of rotational distance so that driven gear 3 rotates only a predetermined amount of one revolution for every revolution of drive gear 4, which predetermined amount is the same for every revolution of drive gear 4. Thus, roll 8, in engagement with medium 11, is driven by driven gear 3 the same predetermined amount of rotational distance thereby intermittently moving medium 11 a predetermined amount in the direction indicated by arrow C in FIG. 1.

Thus, two different gear tooth arrangements are provided to bring about a precise distance of angular rotation to driven gear 3 and wherein the start of rotation of driven gear 3 is brought about by engagement of tooth portions 3B and 4B and the termination of rotation of driven gear 3 is brought about by engagement of tooth portions 3C and 4D. As a result, the forward surface of a gear tooth 3C will abut against the raised cam surface 4C of gear 4 so that driven gear 3 will be prevented from further rotation. In this condition, the surface of cam 4C will be slightly extending between two gear teeth 3C, as illustrated in FIG. 2, so that further rotation of driven gear 3 is not possible.

If an abnormal load is place on medium feed apparatus 1, such as caused by a medium jam or the like during the rotation of driven gear 3 and roll 8, medium fed roll shaft 2 will move in the direction indicate by arrow E in FIG. 2 along elongated aperture 5A of support member 5 against the bias force of spring 6. This transverse movement of shaft 2 is arcuate in that end 2A of shaft 2 in frame 1A will function as a fulcrum point. As a result, driven gear 3 will be disengaged from drive gear 4 and the possibility of damage to these gears or their associated power drive train is prevented.

The preciseness of medium feed pitch is determined by the preciseness of the positional relationship wherein tooth portion 3C of driven gear 3 comes in contact with cam 4C of drive gear 4. This is significantly affected by the preciseness of the distance between the rotational centers of driven gear 3 and drive gear 4. Also, the preciseness of the amount of gear engagement between driven gear 3 and drive gear 4 is also significantly affected by the preciseness of distance between the rotational centers of driven gear 3 and drive gear 4. In this invention, the preciseness of the distance between the rotational centers of driven gear 3 and drive gear 4 is determined exclusively by the preciseness of the diameters of cylindrical portion 3A of driven gear 3 and cylindrical portion 4A of drive gear 4. Therefore, a very precise dimensional relationship can be established between the centers of these two gears translating into precise determination of the amount of rotational movement per cycle of operation of driven gear 3.

Figure 3:
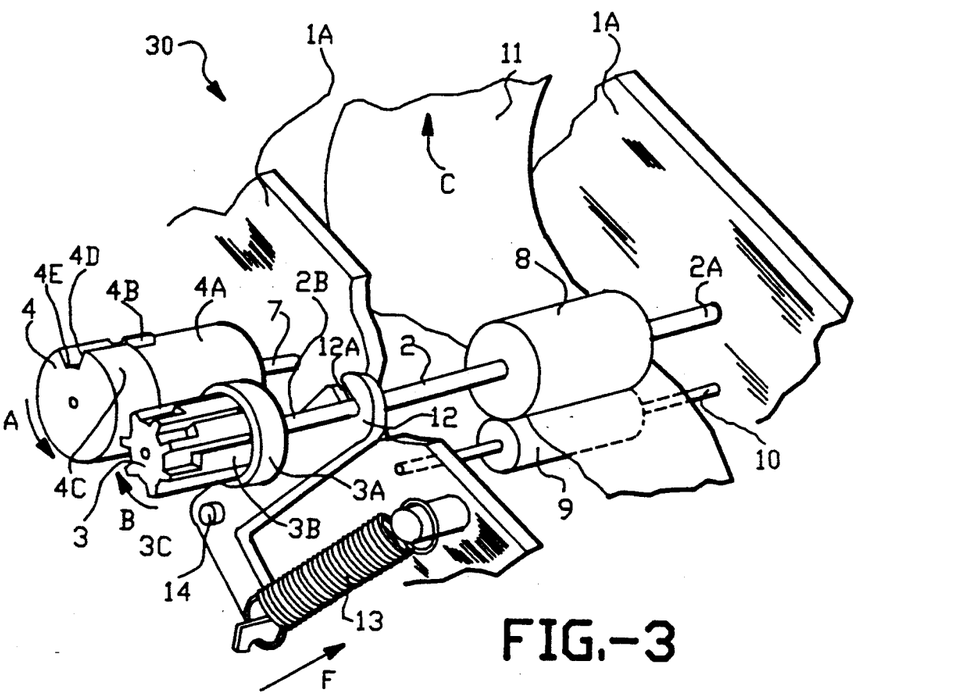
FIG. 3 is a perspective view of a medium feeding apparatus of another embodiment of this invention.
Figure 4:
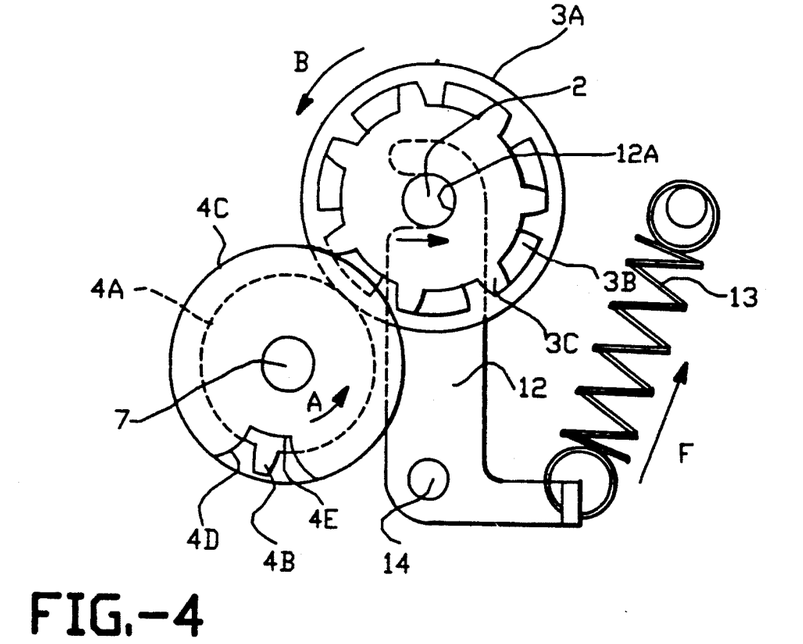
FIG. 4 is a detailed view of a side elevation of the gear mechanism shown in FIG. 3.

Another embodiment of this invention is shown in FIGS. 3 and 4. Many components in this embodiment are similar to components found in the embodiment of FIGS. 1 and 2 and, therefore, like components of these embodiments carry the same numerical identification and the description thereof relative to FIGS. 1 and 2 equally applies to FIGS. 3 and 4. The functional operation of gear tooth portions 4B, 4D and cam 4C of gear 4 and teeth portions 3B and 3C of gear 3 are the same as in FIGS. 1 and 2. In this embodiment, shaft 2 of medium feed apparatus 30 is supported at end 2B in a support slot 12A of L-shaped lever member 12. Member 12 is rotatably supported on shaft 14 which is fixed to frame 1A. Thus, member 12 is employed as a support for driven gear 3 in place of support member 5 secured in frame 1A in the embodiment in FIGS. 1 and 2. Lever member 12 rotates on shaft 14, which is the fulcrum point, and one end of lever member 12 supports medium feeding roller shaft 2 and the other end is biased in the direction of arrow F by the force of coil spring 13. Thus, lever member 12 biases driven gear 3 in a direction opposite to the direction of arrow G in FIG. 4 thereby bringing cylindrical portion 3A of driven gear 3 into contact with cylindrical portion 4A of drive gear 4. Upon the occurrence of an abnormal load applied against the force of gears 3 and 4 due, for example, to a paper jam or the like, driven gear 3 together with lever member 12 are translated in the direction of arrow G against the force of spring 13 thereby enabling disengagement of these gears.

Figure 5:
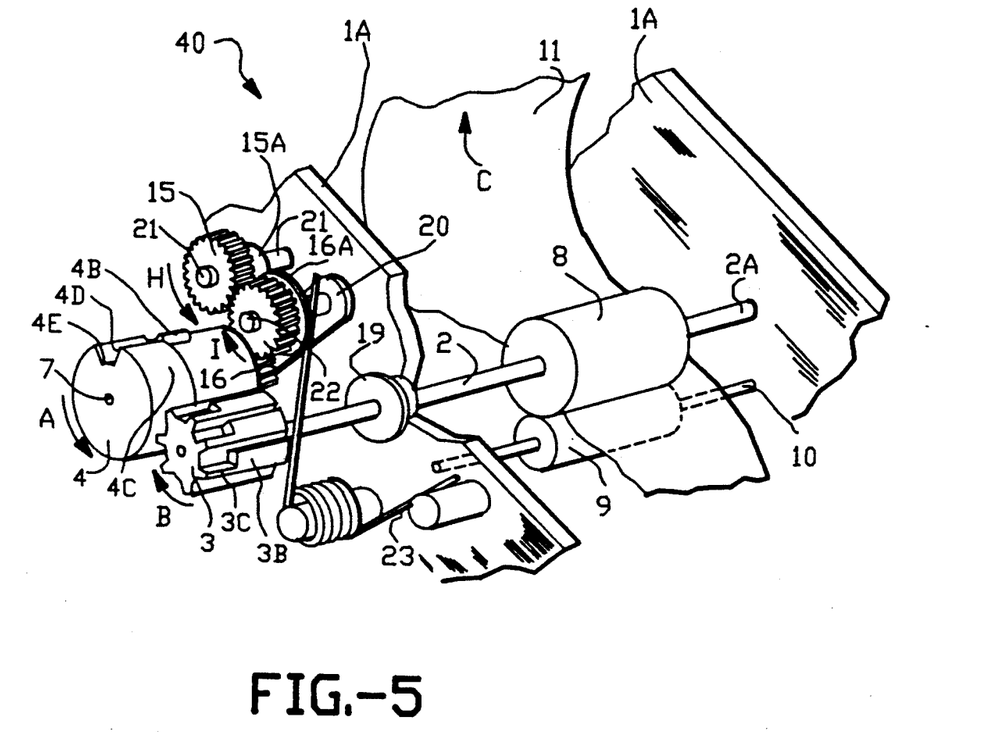
FIG. 5 is perspective view of a medium feeding apparatus of still another embodiment of this invention.
Figure 6:
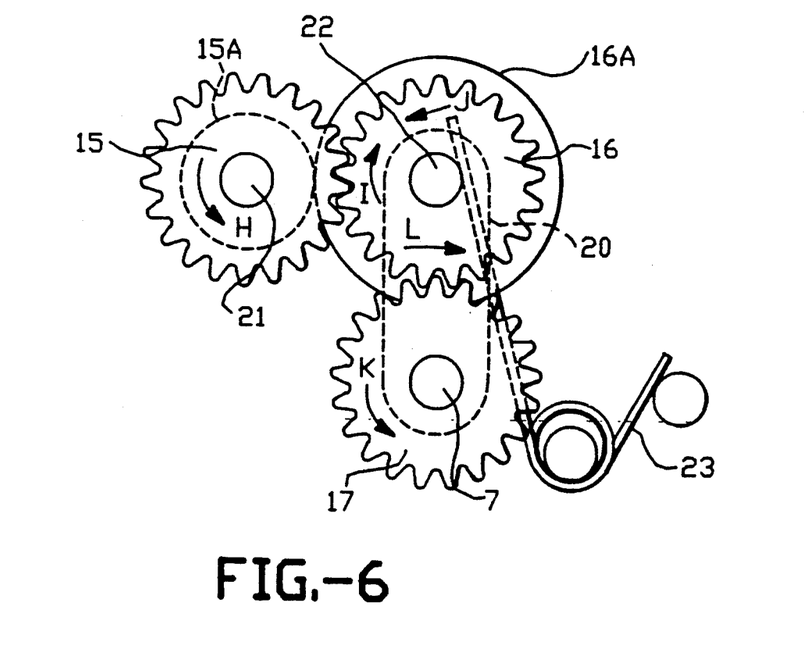
FIG. 6 is a detailed view of a side elevation of the gear mechanism shown in FIG. 5.

The next embodiment of this invention is shown in FIGS. 5 and 6. Many components in this embodiment are similar to components found in the embodiment of FIGS. 1 and 2 and, therefore, like components of these embodiments carry the same numerical identification and the description thereof relative to FIGS. 1 and 2 equally applies to FIGS. 4 and 5. The functional operation of gear tooth portions 4B, 4D and cam 4C of gear 4 and teeth portions 3B and 3C of gear 3 are the same as in FIGS. 1 and 2. With reference to FIGS. 5 and 6, medium feed apparatus 40 comprises drive gear 15 rotatably supported on shaft 21, which is fixed on frame 1A, and gear 15 is continuously rotated in the direction of arrow H from a power source, such as a motor or the like (not shown). The rotational power of driving gear 15 is transmitted to idler gear 16, rotated in a direction indicated by arrow I. Gear 16, in turn, drives transmission gear 17 in a direction indicated by arrows A and K respectively shown in FIGS. 5 and 6. Transmission gear 17 is fixed to drive gear 4, both n the same shaft 7. Gear 4, in turn, intermittently drives driven medium feed gear 3 in a manner previously explained in connection with FIGS. 1 and 2. Thus, gears 15, 16, 17 and 4 may be continuously rotating while driven gear 3 is periodically rotated by means of the periodic interengagement of the respective tooth portions of gears 3 and 4.

As best shown in FIG. 6, idler gear 16 is rotatably supported on shaft 22 which is secured to the upper end of elongated support member 20. The lower end of support member 20 is rotatably supported on shaft 7 which is fixed to frame 1A. Thus, gears 16 and 17 are in fixed relationship relative to each other and are in continuous rotational engagement but idler gear 16 may be disengaged from drive gear 15 by rotational movement of member 20 about shaft 7 in the direction of arrow L. Spring 23 is supported from frame 1A in a manner to bias shaft 22 in the direction indicated by arrow J in FIG. 6 causing cylindrical portion 16A of idler gear 16 to engage with cylindrical portion 15A of drive gear 15. Therefore, the preciseness of the distance between the rotational centers of drive gear 15 and driven gear 16 is determined exclusively by the preciseness of the diameters of cylindrical portions 15A and 16A. Thus, the surfaces of cylindrical portions 15A and 16A function in a manner similar to the surface of cylindrical portions 3A and 4A to function as a gauge to maintain a predetermined distance relative to the center of gears 15 and 16. In this embodiment, therefore, the cylindrical surfaces of gears 3 and 4 need not be in engagement with each other.

Medium feed gear 3 is intermittently driven by drive gear 4, via transmissive gear 17, in the manner previously explained in connection with FIGS. 1 and 2. As a result, a fixed predetermined amount of medium 11 is moved forward in apparatus 40 in the direction indicated by arrow C. In the presence of an abnormal load applied against the above described gear system, such as caused by a paper jam, idler gear 16 together with its shaft 22 will be rotated with support member 20 about shaft 7 in a direction indicated by arrow L against the biasing force of spring 23 thereby enabling disengagement of drive gear 15 from idler gear 16.

Figure 7:
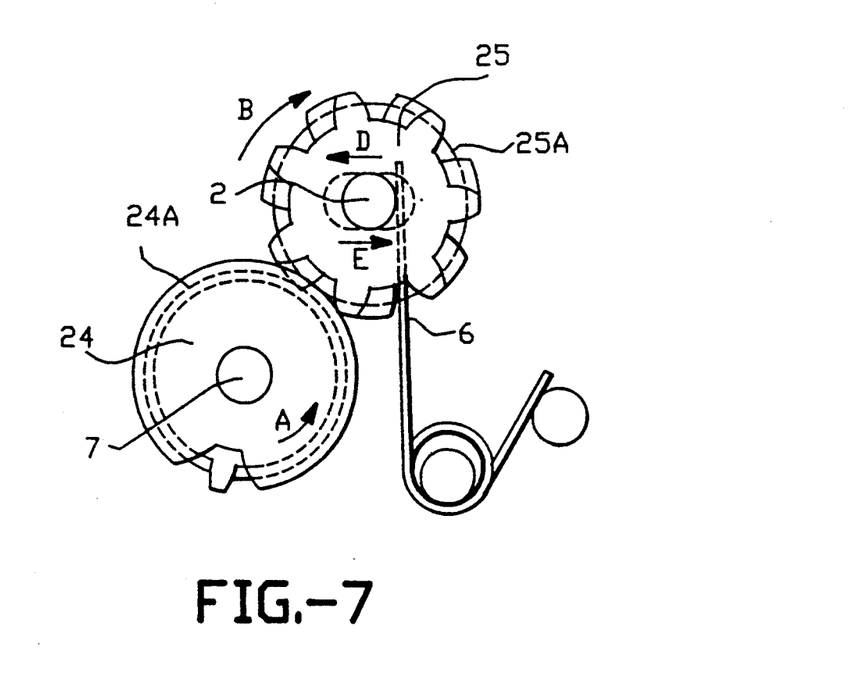
FIG. 7 is still another embodiment of a gear mechanism comprising this invention.
Figure 8:
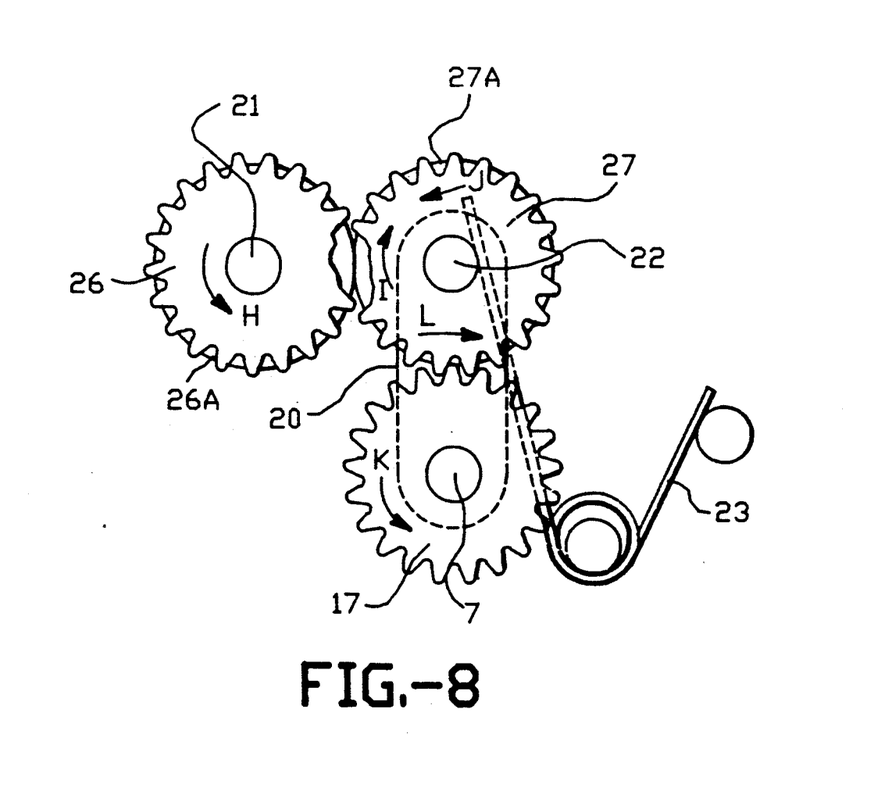
FIG. 8 is a further embodiment of a gear mechanism comprising this invention.

Reference is now made to the embodiments shown in FIGS. 7 and 8 which are respectively similar to the embodiments shown in FIGS. 1 and 2, and FIGS. 5 and 6. In both these embodiments, the diameter of cylindrical portions of each gear is made equal to the pitch diameter of each respective gear. In FIG. 7, the diameter of cylindrical portion 24A of driven gear 24 is equal to the pitch diameter of drive gear 24 and the diameter of cylindrical portion 25A of driven gear 25 is equal to the pitch diameter of driven gear 25. In FIG. 8, the diameter of cylindrical portion 26A of driving gear 26 is equal to the pitch diameter of drive gear 26 and the diameter of cylindrical portion 27A of driven gear 27 is equal to the pitch diameter of driven gear 27. Thus, while these combination gears are rotated with their gear teeth engaged, the surfaces of their respective cylindrical portions will not engage one another thereby preventing wear and tear on these components as well as reducing the rotational load on the gears themselves.

While the invention has been described in conjunction with several specific embodiments, it is evident to those skilled in the art that many further alternatives, modifications and variations will be apparent in light of the forgoing description. For example, although the gear mechanism of this invention is exemplified relative to a medium feeding apparatus for a printer or the like, this gear mechanism is not limited to this particular application, as the gear mechanism can be equally applied to other applications where there is a requirement for disengagement of gears to prevent their damage during if an abnormal load is applied against the movement of the gears. Further, the invention is not limited to spur type gears of the type shown in the preceding embodiments but also may be employed in connection with bevel gears, helical gears and the like. Thus, the invention described herein is intended to embrace all such alternatives, modifications, applications and variations as fall within the spirit and scope of the appended claims.

What is claimed is:

1. A medium feeding apparatus for intermittent movement of a recording medium of a predetermined amount comprising a gear mechanism having a drive gear and driven gear with means for driving interengagement with one another at least during a portion of their interengagement under normal operating condition of the gear mechanism, said gears mounted for rotation about their rotational centers relative to spatially disposed shafts wherein said driven gear is fixed to rotate its corresponding shaft, medium drive and support roll means supported in the path of said medium and secured relative to said driven gear shaft to engage and move said medium upon rotational movement of said driven gear, means to permit an increase in separation between said gear rotational centers during imposition on said gears of an abnormal operating condition preventing damage to said gears by providing for their disengagement, gauging means associated with each of said gears in regions axially offset from said interengagement means, said gauging means in constant contact with one another during the rotational movement of said gears during said normal operating condition to provide a constant distantal relationship between said gear rotational centers, means to bias said gears toward one another to maintain constant contact of said gear gauging means during said normal operating condition but permitting disengagement of gears via said permit means during an occurrence of said abnormal operating condition, and means to enable said driven gear to move in a direction against said bias means and disengage said gears when said abnormal operating condition is imposed upon said driven gear by said medium drive and support roll means.

2. The medium feeding apparatus of claim 1 wherein said gear driving interengagement means comprises an intermittent driving engagement means on said drive gear having an arcuate engagement portion for driving engagement with said driven gear during a portion of each revolution of said drive gear and said driven gear containing a circumferential engagement portion in opposite, opposed relation with said drive gear arcuate engagement portion during said portion of said driving engagement thereby imparting rotational movement of said driven gear of a predetermined amount per drive gear revolution.

3. The medium feeding apparatus of claim 1 wherein said gauging means comprises circumferential surfaces of corresponding cylindrical portions on each of said gear rotational centers, said circumferential surfaces in engagement with one another due to said bias means.

4. The medium feeding apparatus of claim 3 wherein the diameter of the cylindrical portion of said drive gear is equal to the pitch diameter of said drive gear and the diameter of the cylindrical portion of said driven gear is equal to the pitch diameter of said driven gear.

5. A medium feeding apparatus for intermittent movement of a recording medium of a predetermined amount comprising a gear mechanism having a drive gear and driven gear with means for driving interengagement with one another at least during a portion of their interengagement under normal operating condition of the gear mechanism, said gears mounted for rotation about their rotational centers relative to spatially disposed spaced shafts wherein said driven gear is fixed to rotate its corresponding shaft, medium drive roll means supported in the path of said medium and secured relative to said driven gear shaft to engage and move said medium upon rotational movement of said driven gear, means to permit an increase in separation between said gear rotational centers during imposition on said gears of an abnormal operating condition preventing damage to said gears by providing for their disengagement, gauging means associated with each of said gears in regions axially offset from said interengagement means, said gauging means in constant contact with one another during the rotational movement of said gears during said normal operating condition to provide a constant distantal relationship between said gear rotational centers, and means to bias said gears toward one another to maintain constant contact of said gear gauging means during said normal operating condition but permitting disengagement of gears via said permit means during an occurrence of said abnormal operating condition.

6. The medium feeding apparatus of claim 5 including means to enable said driven gear to move in a direction against said bias means and disengage said gears when said abnormal load condition is imposed upon said driven gear.

7. The medium feeding apparatus of claim 5, wherein said gear driving interengagement means comprises an intermittent driving engagement means on said drive gear having an arcuate engagement portion for driving engagement with said driven gear during a portion of each revolution of said drive gear and said driven gear containing a circumferential engagement portion in opposite, opposed relation with said drive gear arcuate engagement portion during said portion of said driving engagement thereby imparting rotational movement of said driven gear of a predetermined amount per drive gear revolution.

8. The medium feeding apparatus of claim 7 including means to enable said driven gear to move in a direction against said bias means and disengage said gears when said abnormal load condition is imposed upon said driven gear.

9. The medium feeding apparatus of claim 5 wherein said gauging means comprises circumferential surfaces of corresponding cylindrical portions on each of said gear rotational centers, said circumferential surfaces in engagement with one another due to said bias means.

10. The medium feeding apparatus of claim 9 the diameter of the cylindrical portion of said drive gear is equal to the pitch diameter of said drive gear and the diameter of the cylindrical portion of said driven gear is equal to the pitch diameter of said driven gear.

11. A gear mechanism comprising
a drive gear and driven gear mounted on spaced rotational centers for rotational driving interengagement with one another at least during a portion of their interengagement under normal operating condition of the gear mechanism,
means to permit an increase in separation between said gear rotational centers during imposition on said gears of an abnormal operating condition preventing damage to said gears by providing for their disengagement,
a cylindrical portion axially offset relative to each of said drive and driven gears,
means to bias said gears toward one another so that the surface of the cylindrical portion relative to said drive gear is in continuous, uninterrupted contact with the surface of the cylindrical portion relative to said driven gear during rotational movement of said gears during said normal operating condition to provide a constant distantal relationship between said gear rotational centers,
one of said gears having an arcuate engagement portion for driving engagement with the other said gears during a portion of each revolution of said one of said gears, and
the other of said gears containing a circumferential engagement portion in opposite, opposed relation with said one of said gears arcuate engagement portion during said portion of said driving engagement thereby imparting rotational movement of said other of said gears of a predetermined amount per revolution.

12. A gear mechanism comprising
a drive gear and driven gear mounted on spaced rotational centers for rotational driving interengagement with one another at least during a portion of their interengagement under normal operating condition of the gear mechanism.
means to permit an increase in separation between said gear rotational centers during imposition on said gears of an abnormal operating condition preventing damage to said gears by providing for their disengagement,
a cylindrical portion axially offset relative to each of said drive and driven gears,
means to bias said gears toward one another so that the surface of the cylindrical portion of said drive gear is in continuous, uninterrupted contact with the surface of the cylindrical portion of said driven gear during rotational movement of said gears during said normal operating condition to provide a constant distantal relationship between said gear rotational centers,
said drive gear having an arcuate engagement portion for driving engagement with said driven gear during a portion of each revolution of said drive gear, and
said driven gear containing a circumferential engagement portion in opposite, opposed relation with said drive gear arcuate engagement portion during said portion of said driving engagement thereby imparting rotational movement of said driven gear of a predetermined amount per drive gear revolution.

13. The gear mechanism of claim 12 wherein the diameter of the cylindrical portion of said drive gear is equal to the pitch diameter of said drive gear and the diameter of the cylindrical portion of said driven gear is equal to the pitch diameter of said driven gear.

14. A gear comprising
a drive gear and driven gear mounted on spaced rotational centers for rotational driving interengagement with one another at least during a portion of their interengagement under normal operating condition of the gear mechanism,
a cylindrical portion axially offset relative to each of said drive and driven gears,
means to permit an increase in separation between said gear rotational centers during imposition on said gears of an abnormal operating condition preventing damage to said gears by providing for their disengagement,
means to bias said driven gear toward said drive gear so that the surface of the cylindrical portion of said drive gear is in constant, uninterrupted contact with the surface of the cylindrical portion of said driven gear during rotational movement of said geard during said normal operating condition during said normal operating condition to provide a constant distantal relationship between said gear rotational centers, and
means to enable said driven gear to move in a direction against said bias means and disengage said gears when said abnormal operating condition is imposed upon said driven gear.

15. The gear mechanism of claim 14 wherein the diameter of the cylindrical portion of said drive gear is equal to the pitch diameter of said drive gear and the diameter of the cylindrical portion of said driven gear is equal to the pitch diameter of said driven gear.

16. The gear mechanism of claim 15 wherein
said drive gear has an arcuate engagement portion for driving engagement with said driven gear during a portion of each revolution of said drive gear and
said driven gear containing a teeth portion in opposite, opposed relation with said drive gear arcuate engagement portion during said portion of said driving engagement thereby imparting rotational movement of said driven gear of a predetermined amount per drive gear revolution.

17. The gear mechanism of claim 14 wherein
said drive gear has an arcuate engagement portion for driving engagement with said driven gear during a portion of each revolution of said drive gear and
said driven gear containing a teeth portion in opposite, opposed relation with said drive gear arcuate engagement portion during said portion of said driving engagement thereby imparting rotational movement of said driven gear of a predetermined amount per drive gear revolution.

18. A gear mechanism comprising
a drive gear and driven gear having means for driving interengagement with one another at least during a portion of their interengagement under normal operating condition of the gear mechanism.
said gears mounted for rotation about their rotational centers relative to spatially disposed shafts,
means to permit an increase in separation between said gear rotational centers during imposition on said gears of an abnormal operating condition preventing damage to said gears by providing for their disengagement, gauging means associated with each of said gears in regions axially offset from said interengagement means, said gauging means in constant contact with one another during the rotational movement of said gears during said normal operating condition to provide a constant distantal relationship between said gear rotational centers, and means to bias said gears toward one another to maintain constant contact of said gear gauging means during said normal operating condition but permitting disengagement of gears via said permit means during an occurrence of said abnormal operating condition.

19. The gear mechanism of claim 18 including means to enable said driven gear to move in a direction against said bias means and disengage said gears when said abnormal load condition is imposed upon said driven gear.

20. The gear mechanism of claim 18 wherein said gear driving interengagement means comprises an intermittent driving engagement means on said drive gear having an arcuate engagement portion for driving engagement with said driven gear during a portion of each revolution of said drive gear, and said driven gear containing a circumferential engagement portion in opposite, opposed relation with said drive gear arcuate engagement portion during said portion of said driving engagement thereby imparting rotational movement of said driven gear of a predetermined amount per drive gear revolution.

21. The gear mechanism of claim 20 including means to enable said driven gear to move in a direction against said bias means and disengage said gears when said abnormal load condition is imposed upon said driven gear.

22. The gear mechanism of claim 18 wherein said gauging means comprises circumferential surfaces of corresponding cylindrical portions on each of said gear rotational centers, said circumferential surfaces in engagement with one another due to said bias means.

23. The gear mechanism of claim 22 the diameter of the cylindrical portion of said drive gear is equal to the pitch diameter of said drive gear and the diameter of the cylindrical portion of said driven gear is equal to the pitch diameter of said driven gear.

24. The gear mechanism of claim 18 wherein said gear driving interengagement means comprises an intermittent driving engagement means on said drive gear for engagement with said driven gear during a portion of each revolution of said drive gear to drive said driven gear in substantially uniform stepped movement.

25. The gear mechanism of claim 18 wherein each of said gauging means comprises a cylindrical surface which are in constant contact with one another during the rotational movement of said gears during said normal operating condition.

* * * * *